Figure 1:
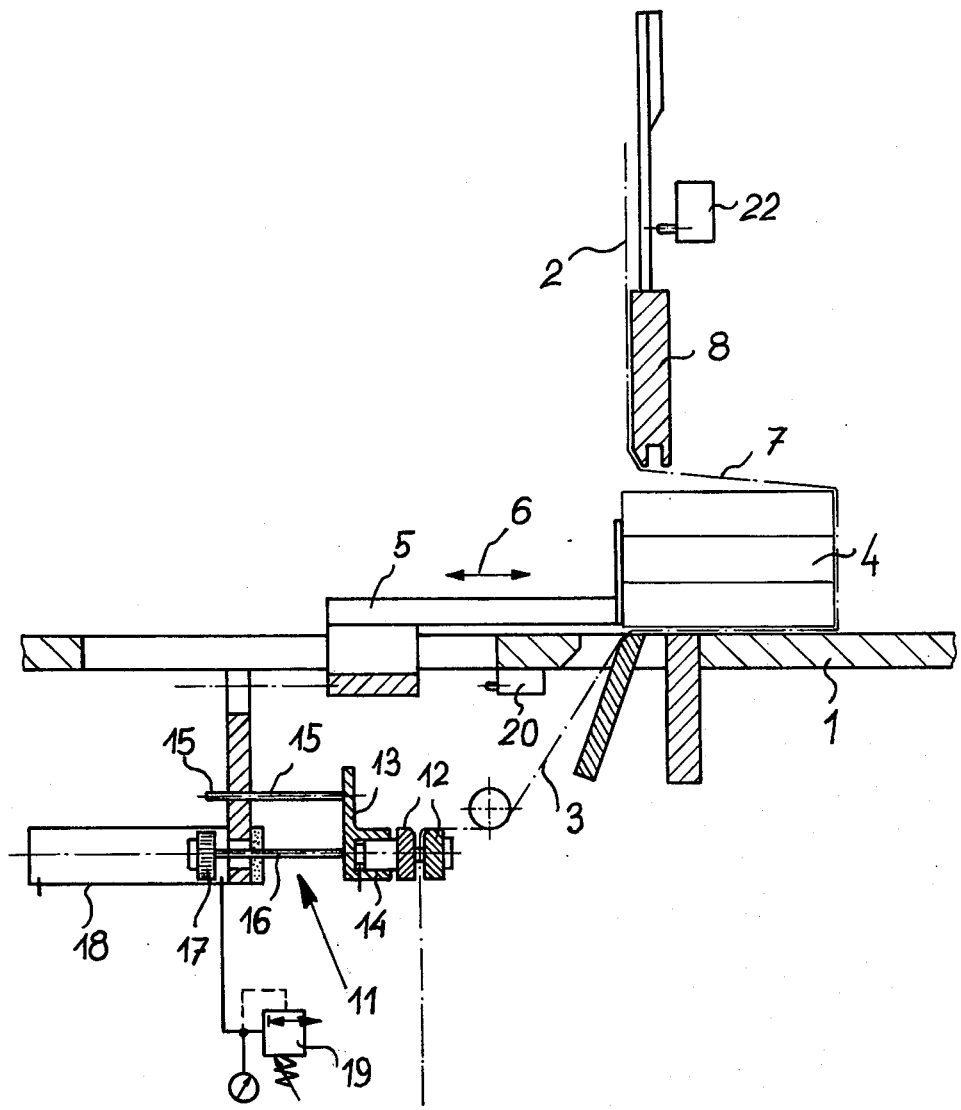

United States Patent [19]

Noack

[11] 3,946,539

[45] Mar. 30, 1976

[54] APPARATUS FOR WRAPPING OBJECTS

[75] Inventor: Fritz Noack, Ottobeuren, Germany

[73] Assignee: Firma Emil Pester, Platinen-u. Apparatefabrik, Wolfertschwenden, Germany

[22] Filed: Sept. 5, 1974

[21] Appl. No.: 503,357

[30] Foreign Application Priority Data
Oct. 5, 1973 Germany............................ 2350130
Oct. 10, 1973 Germany............................ 2350828

[52] U.S. Cl................. 53/198 R; 53/182 R; 53/373
[51] Int. Cl.².......................................... B65B 13/22
[58] Field of Search ............. 53/180, 182, 198, 373

[56] References Cited
UNITED STATES PATENTS

| 3,355,857 | 12/1967 | Tobey .................................... 53/182 |
| 3,490,194 | 1/1970 | Monaghan ......................... 53/182 X |
| 3,728,920 | 4/1973 | Gardner ............................. 53/262 X |

Primary Examiner—Othell M. Simpson
Assistant Examiner—Leon Gilden
Attorney, Agent, or Firm—Haseltine, Lake & Waters

[57] ABSTRACT

Apparatus for wrapping objects with a foil, wherein a foil web is clamped between two jaws of a clamping device and the clamping device is movably arranged and driven to tighten the foil loop surrounding the objects.

11 Claims, 6 Drawing Figures

APPARATUS FOR WRAPPING OBJECTS

This invention relates to apparatus for covering or wrapping objects with a foil wrapping, comprising at least one supply roller for the foil, two clamping elements mounted on either side of the path of movement of the objects and which in the clamping position firmly grip two overlapping sections of the foil loop or band encasing the objects, apparatus for joining the two foil sections and a separating device for separating the foil wrapping thus formed from the rest of the foil. An object of the invention is to provide an improved apparatus of this kind so that the objects can be wrapped much faster than has hitherto been possible.

The invention is characterized in that a clamping device which draws the foil loop taut around the objects is mounted on one side of the path of the objects at a distance from the clamping elements and has, for example, grippers, the foil web being passed in a single layer between the jaws thereof and that the clamping device is mounted to be movable between two end positions and is provided with drive means.

In a further feature of the invention, each clamping element has two spaced clamping surfaces which operate in pairs in order that the two overlapping foil portions can be pressed against each other at two clamping zones between which is mounted an apparatus for relative movement for welding the two foil portions together by applying heat and that a cooling air duct extending over practically the entire width of the foil and having a number of outlet apertures in the direction of the welding zone is mounted on one of the clamping elements directly adjoining one of the clamping faces.

Figure 2:
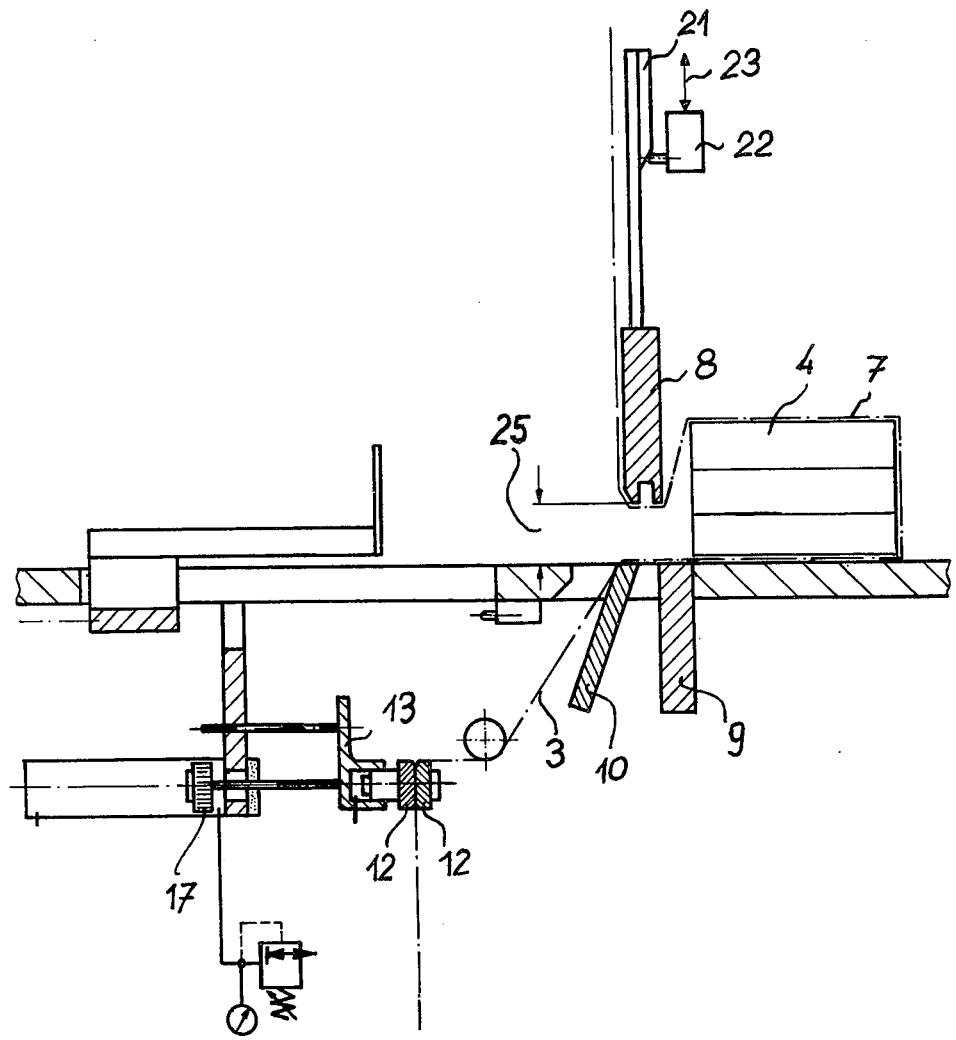
Figure 3:
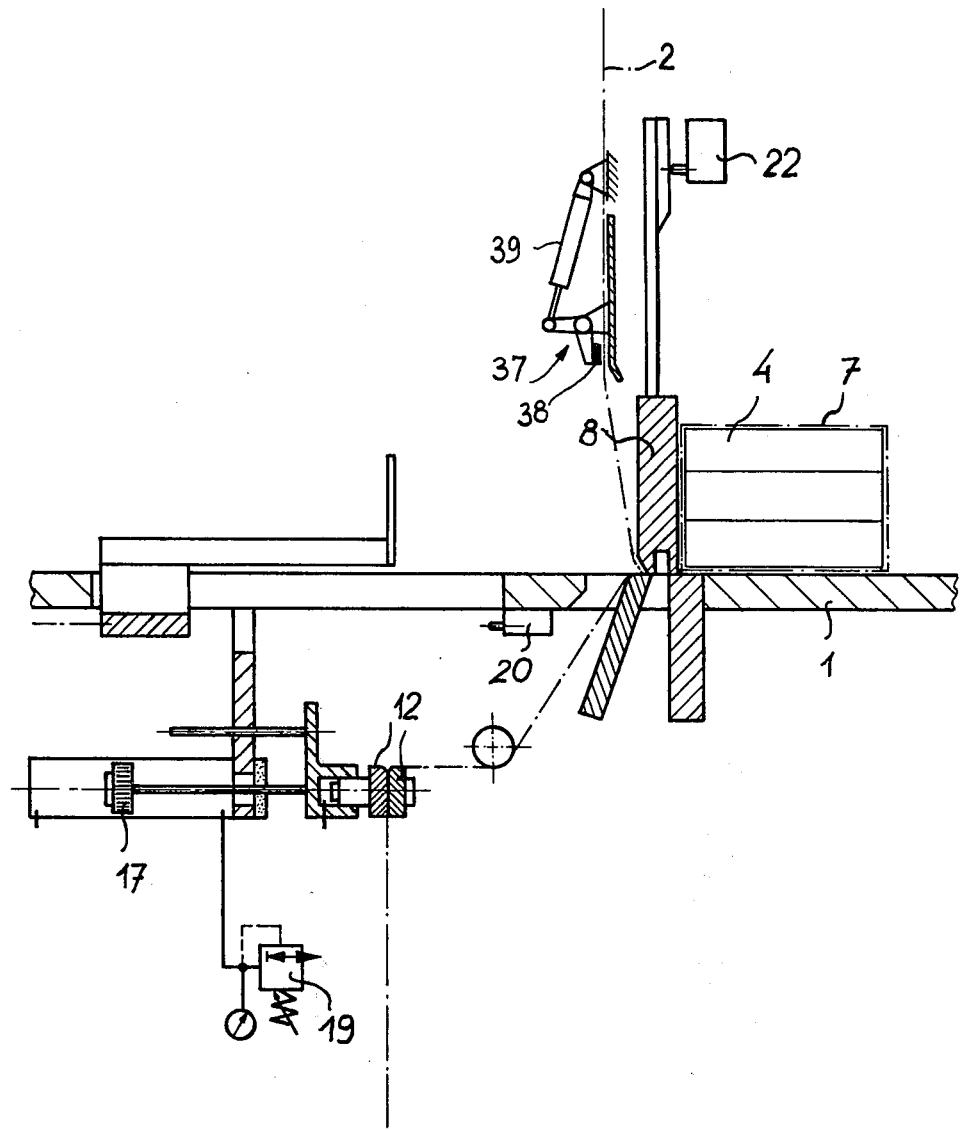
Figure 4:
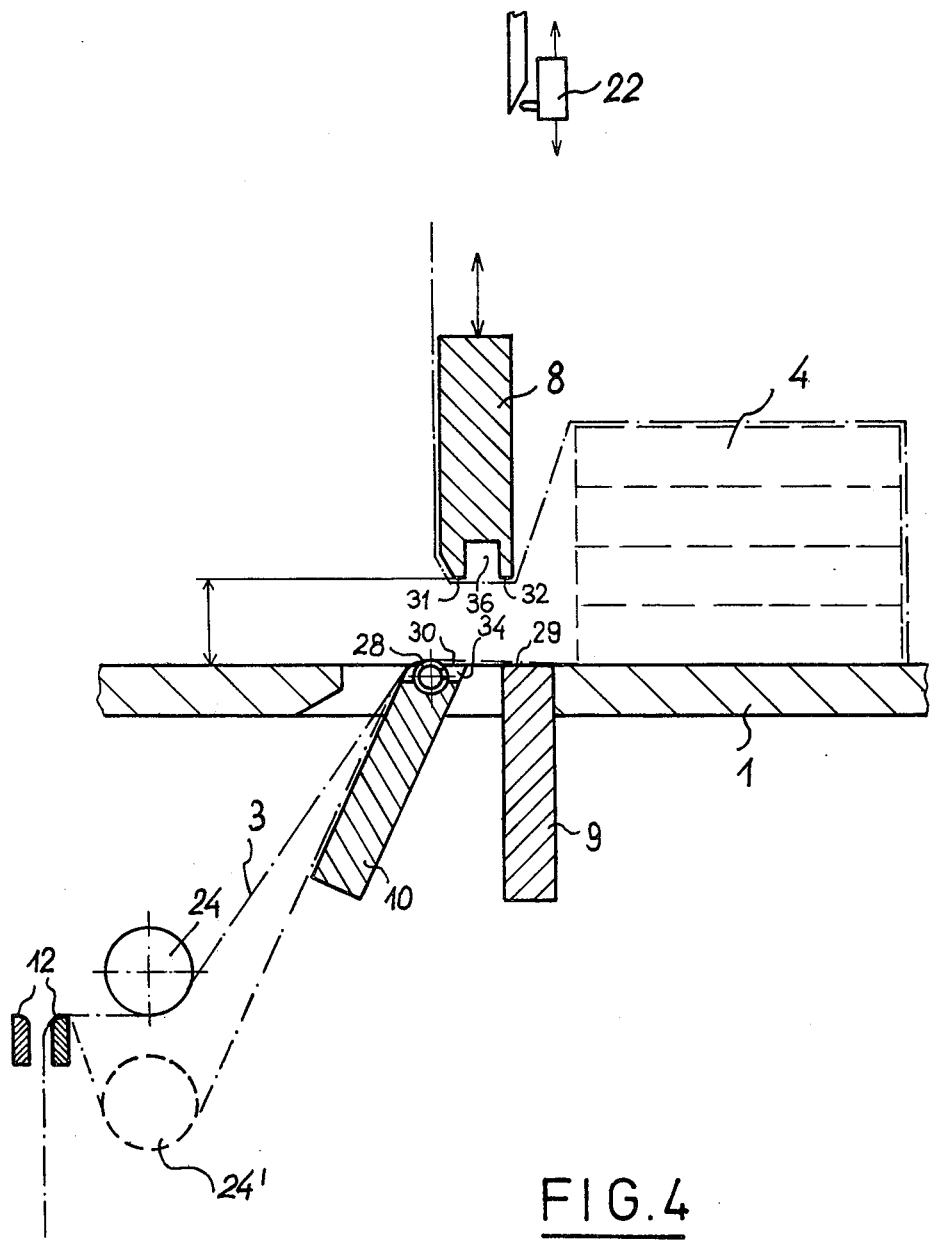
Figure 5:
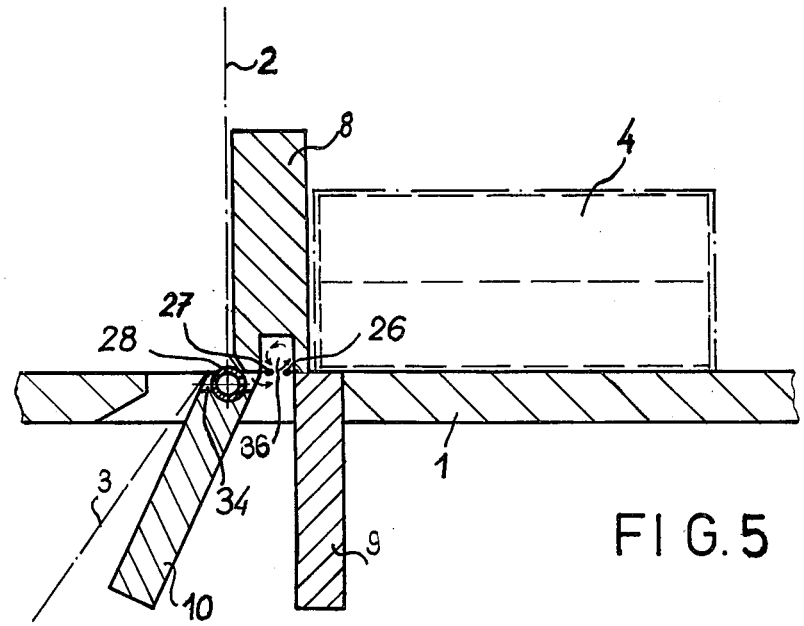
Figure 6:
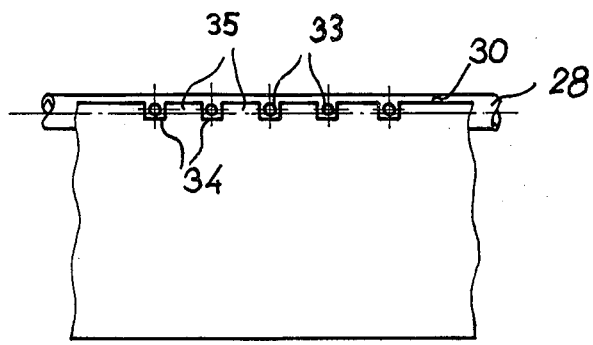

The invention will now be described by way of example with reference to the accompanying drawings wherein:

FIGS. 1 to 3 are diagrammatic illustrations of the most important parts of the packaging apparatus in three successive working stages FIG. 4 illustrates a slightly modified embodiment of the apparatus and FIGS. 5 to 6 illustrate details of a cooling device.

Objects 4, to be wrapped, are pushed along by a slide bar 5 on a supply table 1 between an upper clamping element 8 and a lower two part clamping element 9, 10, wherein a foil web 2 drawn off from an upper supply roll (not shown) is placed round the objects 4 to form a foil loop 7 which is connected to a lower foil web 3 which is passed through a slit in the table 1 to run through clamping jaws 12 of a clamping device 11 and is led to a lower supply roll (not shown). FIG. 1 illustrates parts of the apparatus during movement of the slide bar 5 to the right into the packaging or wrapping position in the direction of arrow 6. A switch 20 is actuated by the slide bar 5 to control a valve (not shown) which supplies compressed air to a compression cylinder 14 and closes the clamping jaws 12.

In FIG. 2 the objects 4 have been pushed into the foremost position and the slide bar 5 has been returned to its most rearward position. The upper clamping element 8 is then moved down in the direction of the lower clamping element 9, 10 in order to close the foil loop 7. During this downward movement of the upper clamping element 8, namely when the latter is at a distance 25 from the supply table 1, which is less than the height of the wrapping around the objects 4, a switch 22 is actuated by a run-on cam 21 which is moved with the clamping element 8 and this switch triggers the clamping device 11 in order to tighten the loop 7. This tightening process takes place at least partly during the closing movement of the upper clamping element 8. It is important that the tightening operation begins as early as possible. This movement is dependent on the type of objects 4 and the height of the package 4a and is adjusted by displacing the switch 22 in the direction of the double arrow 23. At the beginning of the tightening process the front face of the upper clamping element 8 must serve as an abutment for the package 4a so that the tightening process should not be commenced too early.

In many packages the foil loop 7 can slide round easily so that when operating the clamping device the foil web 2 merely slips through and the loop is not tightened. For this purpose FIG. 3 illustrates a brake mechanism 37 which operates in synchronization with the clamping device 11 and clamps the upper foil web 2 opposite the clamping device against bearing rail, wherein a brake shoe 38 is seated on an angle lever which is actuated by a small pressure cylinder 39. This brake shoe 38 prevents the foil web 2 from slipping back during the tightening process but allows the foil web to move owing to the downward movement of the clamping element 8.

The clamping device 11 has a sliding carraiage 13 to which the clamp 12 is attached and is movably guided on the machine frame in a line by means of two rods 15, 16. The rod 16 is designed as a piston rod and at its rear end has a piston 17 which is mounted in a pressure cylinder 18 which is provided with the usual compressed air connections. The pressure medium circuit contains a pressure reducing valve 19 through which the desired tension in the foil loop 7 can be adjusted. The switch 22 actuates a valve which supplies compressed air through the pressure reducing valve 19 to the cylinder 18 whereby the carriage 13 is moved to the left until the desired bias in the loop 7 around the packaged article 4 is obtained. (FIG. 3). This tightening process which is undertaken by the clamping device 11 is terminated after the upper clamping element 8 has been moved into the closed position in which two space clamping faces 31, 32 of the upper clamping element 8 press two overlapping portions of the foil web directly adjoining the package 4a against the clamping faces 29, 30 of the two part lower clamping element 9, 10. After the two clamping elements have firmly clamped the foil webs 2, 3 between the front clamping zones 29, 32 and the rear clamping zones 30, 31 the clamping device 11 is released. A heated plate (not shown) is moved up between the two parts 9, 10 of the lower clamping element and separates the two foil webs 2, 3 between the clamping zones and two welded seams 26, 27 are formed.

A highly efficient cooling of the welded seams 26, 27 is important for a rapid finish to the process since the grip between the clamping elements must not be released beforehand. For this purpose the fixed rear lower clamping element 10 has a cooling air pipe 28 mounted directly adjoining its clamping surface 30, the pipe 28 extending over the entire width of the clamping element and fitted into a corresponding groove which directly adjoins the clamping face 30. The pipe 28 has a plurality of four outlet apertures 33 directed towards the welded seams 26, 27. The clamping surface 30 has a plurality of air guide slits 34, each slit 34 being associated with an aperture 33. The webs remaining between each two slits 34 form the individual sections of the clamping surface 30.

In the cooling system it is important that the cooling air duct through the cooling pipe 28 lies as close as possible to the welded seams 26, 27. The outlet openings of the clamping surface must therefore by directly adjacent. Furthermore not only are the welded seams to be cooled directly by the coldest possible air but also the adjoining components are to be kept cool. Mounting the cooling air ducts in the rear lower clamping element 10 is therefore advantageous because it is most important to cool the clamping surface on account of the foil web 3 which is in constant abutment therewith.

A U-shaped turbulence channel 36 for the cooling air is formed between the two clamping surfaces 31, 32 of the upper clamping element 8. Supplying air to the lowest possible temperature which cannot be heated previously be any warm components and the special air circulation in the area of the welding zone reduces the cooling time of the apparatus and thus increases the performance of the packaging apparatus.

The grippers or clamps 12 prevents the foil web from slipping through and guarantees a satisfactory tightening. The pressure which is active in the cylinder 18 is adjusted by the reducing valve 19 to the foil web 3 used and to the type of articles 4 which are to be wrapped so that the desired bias during the tightening process can be kept constant within narrow limits. That the clamping step begins before the clamping elements 8, 9, 10 have reached their clamping position not only saves time but also facilitates the tightening process.

FIG. 4 illustrates an alternative insofar as the grippers 12 are not mounted on the clamping device 11 but are stationary with a roller 24 connected to the clamping device 11 and which during operation is moved down into the position 24' shown in chain dotted lines, in order to make the foil loop 7 taut and thus suitably biased, actuation by means of the pressure cylinder 18 is carried out in the manner described above.

What I claim is:

1. Apparatus for covering or wrapping objects with a foil wrapping, comprising at least one supply roller for the foil, two clamping elements mounted on either side of the path of movement of the objects, said clamping elements in the clamping position gripping two overlapping portions of the foil loop or band encasing the objects, means for joining the two foil portions, separating means for separating the foil wrapping thus formed from the rest of the foil, tension means drawing the foil loop taut around the objects and mounted on one side of the path of the objects at a distance from said clamping elements, said tension means comprising gripper jaws between which the foil web is passed in a single layer, said tension means having drive means and being mounted for movement into an opposite direction with respect to the supply direction of the foil web for tensioning the foil loop before clamping and joining the two foil sections.

2. Apparatus as claimed in claim 1, wherein said tension means has a carriage for reciprocating linear movement.

3. Apparatus as claimed in claim 2, wherein said gripper jaws of said tension means are mounted on the carriage.

4. Apparatus as claimed in claim 1, including a compression cylinder and piston, one of said gripper jaws being connected to the piston of said compression cylinder and the other jaw being mounted to be movable thereon, and drive means for the movable jaw.

5. Apparatus as claimed in claim 1, including a control switch, at least one of said clamping elements being movably arranged, said control switch being mounted in the path of movement of a component attached to said movable clamping element to start the working stroke of said tension means before said clamping elements are closed.

6. Apparatus as claimed in claim 5, wherein said control switch is mounted displaceably parallel to the direction of movement of the movable clamping element.

7. Apparatus as claimed in claim 1, including brake means for the foil web, said brake means being operative when said tension means is operative, said brake means being on the side of the path of movement of object opposite said tension means.

8. Apparatus for covering or wrapping objects with foil wrapping, comprising at least one supply roller for the foil, two clamping elements mounted on either side of the path of movement of the objects, said clamping elements in the clamping position firmly gripping two overlapping portions of the foil loop or band encasing the objects, means for joining the two foil portions, separating means for separating the foil wrapping thus formed from the rest of the foil, and tension means drawing the foil loop taut around the objects, each clamping element having two spaced clamping surfaces operating in pairs so that tow overlapping foil portions can be pressed against each other at two clamping zones between which is mounted means for relative movement for heat sealing the two foil portions together, a cooling air duct extending over sustantially the entire width of the foil and having a number of outlet apertures in the direction of the sealing zone, said duct being mounted on one of the clamping elements directly adjoining one of the clamping faces.

9. Apparatus as claimed in claim 8, wherein said cooling air duct comprises a pipe mounted in a groove of the clamping element adjoining the clamping face, said clamping face being formed by a number of webs between which are formed air guide slits for the apertures in the pipe.

10. Apparatus as claimed in claim 8, wherein one clamping element is movable between two end positions, the other clamping element being substantially immovable, the cooling air duct being on the latter clamping element.

11. Apparatus as claimed in claim 8, including a turbulent duct of U-shaped cross-section for the cooling air between the two clamping faces of the clamping element opposite the cooling air duct.

* * * * *